(12) United States Patent
Reese et al.

(10) Patent No.: US 7,881,585 B2
(45) Date of Patent: Feb. 1, 2011

(54) MULTI VIDEO DEVICE CONTROL AND EXPANSION METHOD AND APPARATUS

(75) Inventors: Daniel J. Reese, Landisville, PA (US); Douglas M. Camens, Lancaster, PA (US); Paul J. Bodell, Lancaster, PA (US)

(73) Assignee: Robert Bosch GmbH, Stuttgart (DE)

(*) Notice: Subject to any disclaimer, the term of this patent is extended or adjusted under 35 U.S.C. 154(b) by 1977 days.

(21) Appl. No.: 09/819,788

(22) Filed: Mar. 28, 2001

(65) Prior Publication Data

US 2002/0141732 A1    Oct. 3, 2002

(51) Int. Cl.
*H04N 5/91* (2006.01)

(52) U.S. Cl. .................................. 386/111; 385/117

(58) Field of Classification Search .............. 386/46, 386/52, 54, 109, 112, 125, 107, 117; 348/153
See application file for complete search history.

(56) References Cited

U.S. PATENT DOCUMENTS

| | | | | |
|---|---|---|---|---|
| 4,963,995 A * | 10/1990 | Lang | .............. | 386/54 |
| 5,001,473 A | 3/1991 | Ritter et al. | | |
| 5,583,796 A | 12/1996 | Reese | | |
| 5,666,363 A * | 9/1997 | Osakabe et al. | .............. | 370/426 |
| 5,923,817 A * | 7/1999 | Nakamura | .............. | 386/124 |
| 5,930,473 A * | 7/1999 | Teng et al. | .............. | 709/204 |
| 6,002,995 A * | 12/1999 | Suzuki et al. | .............. | 702/188 |
| 6,011,901 A | 1/2000 | Kirsten | | |
| 6,181,867 B1 * | 1/2001 | Kenner et al. | .............. | 386/46 |
| 6,208,379 B1 | 3/2001 | Oya et al. | | |
| 6,330,025 B1 * | 12/2001 | Arazi et al. | .............. | 348/143 |
| 6,747,554 B1 * | 6/2004 | Higashimura et al. | .............. | 340/506 |
| 6,891,566 B2 * | 5/2005 | Marchese | .............. | 348/211.3 |

FOREIGN PATENT DOCUMENTS

| | | |
|---|---|---|
| CA | 223764 | 12/1998 |
| EP | 0817479 | 1/1998 |
| EP | 0 895 421 | 2/1999 |
| JP | 2002-78633 | 3/2002 |
| WO | WO 96/36181 | 11/1996 |
| WO | WO 97/08896 | 3/1997 |

OTHER PUBLICATIONS

DMX-16 16-Channel Color, Digital Multiplexer Recorder, 2000 Philips Communication, Security & Imaging, Inc., 2 pages.

* cited by examiner

*Primary Examiner*—Huy T Nguyen
(74) *Attorney, Agent, or Firm*—Kenyon & Kenyon LLP

(57) ABSTRACT

A digital video recorder-controller apparatus (DVRC) having a network port for transmitting and receiving digitized video signals and for controlling one or more other DVRCs, and/or digital video recorders (DVRs, e.g., DVRCs operating in slave-mode). A digital video system including a networked DVRC having cameras and a networked DVR having cameras. The DVR may be remote from the DVRC, yet video signals from the cameras of the both the DVR and the DVRC can be selected, viewed, and/or recorded at the DVRC's location. A method for expanding a digital video system including providing at least one DVRC.

16 Claims, 2 Drawing Sheets

MULTI VIDEO DEVICE CONTROL AND EXPANSION METHOD AND APPARATUS

BACKGROUND OF THE INVENTION

1. Technical Field

The present invention relates generally to a method and system for controlling multiple video input devices, and more particularly, to a control station for centralized controlling and multiplexed recording and selectively displaying video information from a plurality of video cameras.

2. Related Art

In a common video surveillance system, installed in a group of buildings, a plurality of Analog video cameras will be disposed at predetermined locations within each building, and one or more digital video recording devices (DVRs) may be located within each building for recording and/or selectively displaying the video of the building's plurality of video cameras. The video from the plurality of cameras in a given building may be viewed at a central security monitoring area within that building or remote from that building.

Digital video recording devices (DVRs), such as Philips CSI's 4-channel and 16-channel DVRs, are often used to record a programmed selection of video signals generated by a plurality (e.g., 4 or 16) of Analog video cameras that are directly wired to such DVRs. Current methods of viewing and controlling a plurality of digital video recording devices (DVRs), from a single control station involve connecting each of these DVRs to a special external video switching device, such as the Philips LTC 2605/90 System4 video Manager, or to a personal computer. In this configuration, video signals and control signals will be carried on separate and distinct lines, for example, video may be transmitted from each DVR to the Manager as Analog signals through a plurality of coaxial cables, and control signals may be carried from each DVR to the manager via a digital serial wiring connection. Each digital video recording device (DVR) may be in a different room of a building or in an entirely separate building. And each DVR must be video wired directly to such a manager. Thus, operatively connecting a plurality of spatially separated DVRs to a single Manager can involve running a plurality of long video cables to the Manager, and users (e.g., security personnel) can only view and control all video channels at that single location of the manager.

SUMMARY OF THE INVENTION

Accordingly, a first aspect of the invention provides a digital video recorder-controller apparatus (DVRC) comprising a network port for communicatively connecting the DVRC with at least one other apparatus on a network, such as an other DVRC, a DVR (e.g., a DVRC operating in slave-mode), a personal computer, or even an ethernet camera, wherein the DVRC is adapted to transmit through the network port a first selection of digitized video signals, wherein the first selection can include one or more digitized video signals being transmitted to a first other apparatus on the network such as to an other DVRC or to a personal computer, and wherein the DVRC is further adapted to receive through the network port a second selection of digitized video signals, wherein the second selection can include one or more digitized video signals being transmitted by a second other apparatus on the network, such as an other DVRC, a DVR, or even an ethernet camera; wherein the DVRC is further adapted to facilitate designation of the digitized video signals of the second selection. The DVRC may further comprise a plurality of video-out ports adapted to display one or more digitized video signals of the first selection or of the second selection, and at least one control panel adapted to facilitate designation of the digitized video signals of the first selection and of the second selection.

A second aspect of the invention provides a digital video system comprising a network plus a first plurality of video cameras operatively connected to a digital video recorder-controller apparatus (DVRC) on the network, plus a second plurality of video cameras operatively connected to a digital video recorder (DVR) on the network. The DVR has a network port for communicatively interconnecting the DVR with the DVRC on the network. The DVR is adapted to transmit through its network port a selection of digitized video signals, wherein the selection of digitized video signals includes. The DVR may further include a plurality of video-out ports adapted to facilitate the display of one or more video signals on one or more DVR monitors. The DVRC may include all the features and hardware of the DVR, plus the DVRC is adapted to receive through the first network port an other selection of digitized video signals, which may include one or more digitized video signals transmitted by the DVR or by any other video-transmitting apparatus on the network. The DVRC may also include either or both of a built-in control panel and an external control port for a keyboard (i.e., an external control panel) or other external control device, to facilitate the transmission of control signals to the other video-transmitting apparatus on the network.

A third aspect of the invention provides a method for expanding a digital video system comprising providing at least one digital video recorder-controller apparatus (DVRC) having a DVRC network port, and at least one control panel. Each DVRC is adapted to receive through its DVRC network port a selection of digitized video signals and will have sufficient number of DVRC video-out ports to facilitate the display of one or more video signals on one or more video monitors. The DVRC may further include one or more DVRC video-in ports for directly connecting to or otherwise operatively connecting with video cameras.

DETAILED DESCRIPTION OF THE INVENTION

Embodiments of the invention eliminate the need for a separate Manager, and provide a non-computer dependent control station at the site of each DVR, by adapting each DVR to control, via an Ethernet network, all the other video recording devices (DVRs) on the network. Digital video and control signals may therefore be transmitted via ethernet between the inventive digital video recorder-controllers (DVRCs) without a need for any external managers, computers and/or special video switches.

Each DVRC includes a provided network port (e.g. an ethernet network port) and may include hardware and/or software to allow any one DVRC on the network to operate as a "master" while other networked DVRCs or DVRs act as "slave" devices. A DVRC may operate simultaneously as a master and a slave. The master DVRC sends control signals to the slave devices (e.g., DVRs and/or DVRCs operating in slave mode), and the master receives, decodes, and displays video from the slave DVRCs, all through the provided network port (e.g., ethernet interface). Alternatively, all the DVRCs may be configured as slaves, for control by an external control station (e.g., Manager) via the network, such as by a networked PC or more remotely such as by a remote internet-based control station. The inventive DVRCs may be interconnected through conventional Ethernet switches, cables, and/or hubs.

Figure 1:
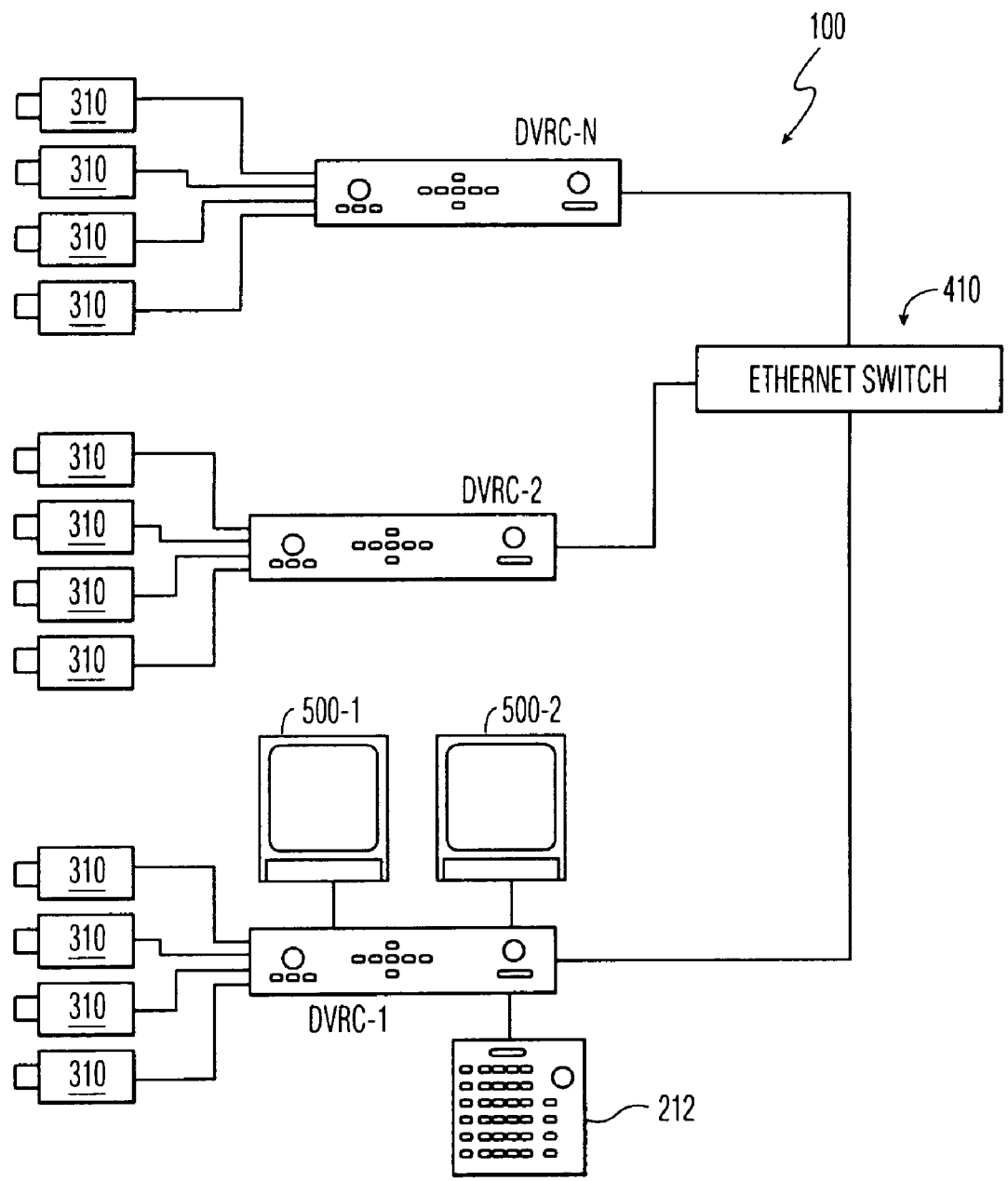
FIG. 1 depicts a simplified block diagram of an ethernet network of inventive Digital Video Recorder-Controllers (DVRCs) wherein a first DVRC is operated in master mode for remote controlling other DVRCs in operating slave move and/or DVRs.

FIG. 1 is a simplified block diagram depicting a video monitoring system 100 comprising a plurality of N (N is an integer) inventive Digital Video Recorder-Controllers (e.g., DVRC-1, DVRC-2, . . . DVRC-N) connected to an ethernet network via a commercially available ethernet switch 410. Each DVRC (e.g., DVRC-1, DVRC-2, . . . DVRC-N) can transmit the video signals of its directly connected video cameras 310 to any other DVRC on the ethernet network for remote recording and/or display of such video images. Conversely, each DVRC (e.g., DVRC-1) can receive from the ethernet the video signals transmitted by the other DVRCs. Each DVCR may be adapted to transmit and/or display, stored (i.e., previously recorded) video data in the same manner as it may transmit and/or display "live" video signals.

A first DVRC (DVRC-1) is depicted as being operated in "master" (i.e., control) mode for remotely controlling at least one other DVRC (e.g., DVRC-2, . . . DVRC-N) which are operating slave mode (and/or for remotely controlling at least one already commercially available Philips DVR). (DVRCs operating in slave-mode can have all the functional characteristics of a DVR, and DVRs may be interchangeable with some slave-mode DVRCs in the video monitoring system 100.)

Each of the DVRCs (e.g., DVRC-1, DVRC-2, . . . DVRC-3) in the system 100 may be directly connected (e.g., via a coaxial video cable) or otherwise operationally connected (e.g., via wireless video broadcast) to at least one video camera 310 as shown in FIG. 1, wherein each DVRC is directly connected to a plurality j (e.g., j equals 4 for each exemplary DVRC shown in FIG. 1) of video cameras 310. Although FIG. 1 shows the number j of Analog video cameras 310 per DVRC as a constant (i.e., j=4), the number j of cameras 310 may be different for each DVRC in the system 100, depending on how many Analog video-in ports each DVRC has built-in, and depending on how many video cameras 310 the user has connected to the DVRC's video-in ports. In alternative embodiments, for example wherein only digital cameras are to be connected, the number (e.g., j) of analogue cameras may be zero. The video cameras 310 may be selected from a wide variety of commercially available Analog video cameras and may be spatially distributed throughout a building or site, each camera being connected by long coaxial cables to video-in ports on their respective DVRCs. It is also to be understood that each video camera 310 may be operationally connected to one or more DVRs and/or DVRCs via a wireless connection, such as a radio-frequency video broadcast from such a video camera. It is also to be understood that while the video signal sources 310 are described herein as "video cameras," signals from any other two-dimensional-image source, such as still-cameras, time-lapse cameras, infra-red sensors, ultraviolet sensors, ex-ray sensors, sonar, radar, microscope cameras, or computer generated image data, or any other frame-based stream of data, may be received by and displayed and/or recorded by the inventive DVRC, as a user's applications may specify. And, of course, audio signals and other contemporaneously generated data signals (e.g., motion detector alarm signals from a camera 310, status data, or signals generated by associated hardware) may be simultaneously received by and displayed and/or recorded with video signals by the inventive DVRC, and references herein to "video signals" will include any such audio signals and contemporaneous data signals. The term "video device" includes a device, including a DVR and a DVRC, that receives-and-displays and/or receives-and-records video signals.

Each DVRC will include j Analog video-in connectors and/or wireless receiving ports for connecting to j Analog video cameras. Additionally, some or all of video cameras connected to the DVRC may be digital video cameras (310D e.g., see digital cameras 310D-1, and 310D-k in FIG. 2), and an appropriate number of connecters and digital ports for connecting k (k is an integer) digital video cameras will be provided on the DVRC. The digital video-in ports may be any suitable digital port, such as a Universal Serial Bus (USB), an ethernet port, a firewire port, etc. (If a plurality of k digital video cameras 310D are to be connected to the DVRC via a single port (e.g., a USB or ethernet port) then one such connector/port may be sufficient to receive all the k digital video signals from that plurality of digital cameras). Each DVRC will have the ability to record (and to digitize and/or compress) video signals received from each of the plurality (e.g., j or j+k) of video cameras directly or operatively connected to that DVRC. Additionally, each DVRC can digitize, compress, encode, and transmit the video signals received from each of the plurality (e.g., j or j+k) of its directly connected video cameras (e.g., 310) to a remote apparatus on the ethernet network, such as to another DVRC, and/or to a personal computer. Video signals transmitted by DVRs (not shown) or by DVRCs (e.g., DVRC-2) on the ethernet network may be remotely displayed at any other DVRC on the network (e.g., DVRC-1) to which at least one external video display monitor 500 (e.g., 500-1 and/or 500-2), or an integrated video-display monitor (not shown) is operationally connected.

Each DVRC may be connected to a maximum number M (M is an integer) of Analog or digital video-display monitors 500, such as for example, closed-circuit television sets, television sets, computer monitors, LCD panels, etc., through M hardware (video-out) ports, connectors and cabling provided therefore in any manner known to persons skilled in the art. Each of the plurality of M video-display monitors that may be connected to the M video-out ports of a given DVRC (e.g., DVRC-1) can display the video signals transmitted from one or more video cameras 310 connected to any DVR (not shown) or DVRC (e.g., DVRC-2 and/or DVRC-N) on the network of the system 100. For example, monitor 500-1 may display full-screen video images from one video camera 310 directly connected to DVRC-1, while monitor 500-2 operating in quad-mode may simultaneously display the video signals of any two cameras directly connected to DVRC-2 plus the video signals of any two cameras directly connected to DVRC-N. Each of the four video signals displayed on monitor 500-2 will be displayed on a predesignated or dynamically selected portion of the screen of that monitor 500-2. Each DVRC may be adapted to output combined video signals such that each attached monitor 500 may also be operated in m-mode, to simultaneously display the video signals of up to m video cameras 310. The m video signals displayed on a given monitor 500 may be a selection of video signals selected from all video signals from cameras 310 that are directly or operatively connected to any DVRC within the system 100. As a further example, a monitor 500 (not shown) operating in quad-mode and directly connected to DVRC-2 may simultaneously display the video signals of any one or more cameras 310 directly or operatively connected to DVRC-2 plus the video signals of any one or more video cameras 310 directly or operatively connected to DVRC-N, plus the video signals of any one or more video cameras 310 directly or operatively connected to DVRC-1.

Each DVRC can record a plurality R (R is an integer) of video signals received as a selection from all V (e.g., V=N×j or V=N×(j+k), or more generally, $V=\Sigma_i j_1$ or $V=\Sigma_1(j_i+k_i)$, where $j_i$=number of video cameras 310, and $k_i$=number of digital video cameras 310D connected to the $i^{th}$ DVR or DVRC (e.g., DVRC-i) in the system 100) video signals that may be directly or operatively connected to any DVR or DVRC within the system 100. The number R of video signals which can be recorded by a given DVRC can be less-than, or equal to, or greater than, the number j (or j+k) of video cameras directly or operatively connected to the given DVRC. Each DVRC may be adapted to simultaneously record the a plurality R of video signals, where R ranges from one up to V video signals of the cameras that may be directly or operatively connected to all DVRs and/or DVRCs on the network within the system 100. For example, DVRC-2, whether or not it has any connected monitors 500 and whether or not it is transmitting any video signals from its (j or j+k) directly connected cameras 310, may be configured to record R video signals, including the video signals from one or more video cameras 310 that are directly or otherwise operatively connected to DVRC-2, plus the video signals from any one or more video cameras 310 directly or otherwise operatively connected to DVRC-N, plus video signals from any one or more video cameras 310 and/or 310D directly or otherwise operatively connected to DVRC-1. And, at the same time, DVRC-1 may be displaying and/or recording the same selection, or a different selection of the V video signals available from all cameras 310 within the system 100. Thus, redundancy and surreptitiousness of video signal recording (and/or display) may be achieved, which may be valuable in the event of an emergency in which one or more DVRCs is damaged, or disabled (such as by fire, or by an intruder or saboteur intent on destroying evidence). Each of the inventive DVRCs may be adapted to store a recorded selection of video signal information from cameras in the system 100 in a digital format on digital storage media, such as semiconductor memory, random access memory (RAM), flash memory, flash memory card, digital tape, and/or hard disk drives HDD (e.g., see hard disk drive 260 in FIG. 2). Accordingly, it is possible to distribute (i.e., transmit) the digital video data of a plurality of cameras 310 within the system 100 to be recorded in a Redundant Array of Independent Disks (RAID) or comparable format such that the catastrophic loss of any one DVRC in the system will not result in loss of any RAID-protected recorded video data. For example, the video data from all V or a selection of the 12 video cameras 310 (e.g., V for the entire system 100 is equal to or greater than 12) shown as being directly connected to three DVRCs (DVRC-1, DVRC-2, and DVRC-N) in FIG. 1 may be displayed on the monitors 500 (e.g., 500-1 and/or 500-2) connected to DVRC-1, while the video data of the same selection, or of a different selection of the V cameras 310 in the system 100 is being recorded in a RAID array manner in the digital storage media of the three DVRCs shown, and/or of any other DVRCs not shown in the system 100. The RAID index RI of a DVRC system 100 can increase with the number N of DVRCs in the system 100, such that RI is equal to or greater than N−1. The RAID index RI of the system 100 may also be increased by including additional (second, third etc.) hard disk drives 260 in one or more of the DVRCs 200. For example, RAID 0 (i.e., RI=0, meaning Non-redundant striped array); RAID 1 (Mirrored arrays); RAID 2 (Parallel array with ECC); RAID 3 (Parallel array with parity); RAID 4 (Striped array with parity); RAID 5 (Striped array with rotating parity), may be achieved by providing the sufficient number of DVRCs and/or additional hard drives therein.

The selection of video signals to be displayed and/or recorded by any of the N DVRCs in the system may be programmed and controlled by any DVRC while operating in "master" mode. The DVCR operating in master mode (e.g., DVCR-1) issues a control signal carried on the ethernet network (via ethernet switch 410) to a DVRC operating in slave mode (e.g., DVRC 2, or DVRC-N) commanding the other (slave) DVRC or a DVR to transmit, and/or display specified video signals (selected channels) from its j+k cameras 310 and 310D or to display and/or record video signals received from other DVRs or DVRCs on the network of the system 100. In response to a control signal issued by the master DVRC, the recipient DVR (or slave-mode DVRCs), is programmed to transmit, display, and/or record the specified selection of video signals that it receives from its connected cameras 310 or from other DVRs or DVRCs on the network of the system 100. In this manner, a first slave-mode DVRC (or DVR) may be directed by the master-mode DVRC to transmit a selected video signal to a particular second slave-mode DVRC, and the second slave-mode DVRC may likewise be directed to display and record the selected video signal.

To facilitate the selection of video signals (for transmission, display and/or recording at any DVRC) and to facilitate remote control of the operations (e.g., transmission, display and/or recording) of any other DVRC (e.g., designated DVRCs operating in slave mode and/or DVRs), an external control keyboard 212 may be permanently secured or removably attached or wirelessly connected operatively to an external control port on the designated "master" DVRC, as shown connected to DVRC-1 in FIG. 1. Either a built-in control panel or an external control panel (e.g., the external control keyboard 212 connected through the external control port, which is basically an external control panel having the functionality of the built-in control panel) can be used to designate one or more digitized video signals to be transmitted by an other apparatus on the network to the DVRC. The term "control panel" as used herein includes conventional and non-conventional equivalents such as, for example, an audio speech-recognizing based or a video lip-reading based user-command interpreting circuit for which an "external control port" may be comprised essentially of an audio microphone or of a video camera.

Any DVRC to which such a built-in control panel, external control port and/or an external control keyboard 212, is operatively attached may be operated as the master-mode DVRC. Persons skilled in the art may also provide arbitration schemes or slave-mode default protocols to handle the possibility of users using or attempting to use more than one control panel and/or more than one master-mode DVRC in a given system 100. The keys, dials, buttons, displays and controls on the control keyboard 212 may be selected, arranged, and optimized for making the selections of video signals from cameras 310 in the system 100 and for remote control of any DVRCs and/or DVRs in the system 100. The control keyboard 212 need not in all embodiments include all "qwerty" (alphabet) keys, but may include such keys for input of labels, annotations, and command lines. The control keyboard 212 may also be provided with a joy-stick type lever or a similar pivoting device to facilitate control and maneuvering of any robotic pan-and-tilt type mechanisms provided to move or to aim the video-cameras 310 in the system 100. Alternatives to a mechanical-type control panel (e.g., control keyboard 212) may be substituted as they become available to users from persons skilled in the art, such alternatives may include human voice-command interpreting control modules (not shown) or programmable control devices (not shown) incorporating artificial intelligence AI, and/or optical pattern (e.g., face, fire, motion) recognition triggers.

Figure 2:
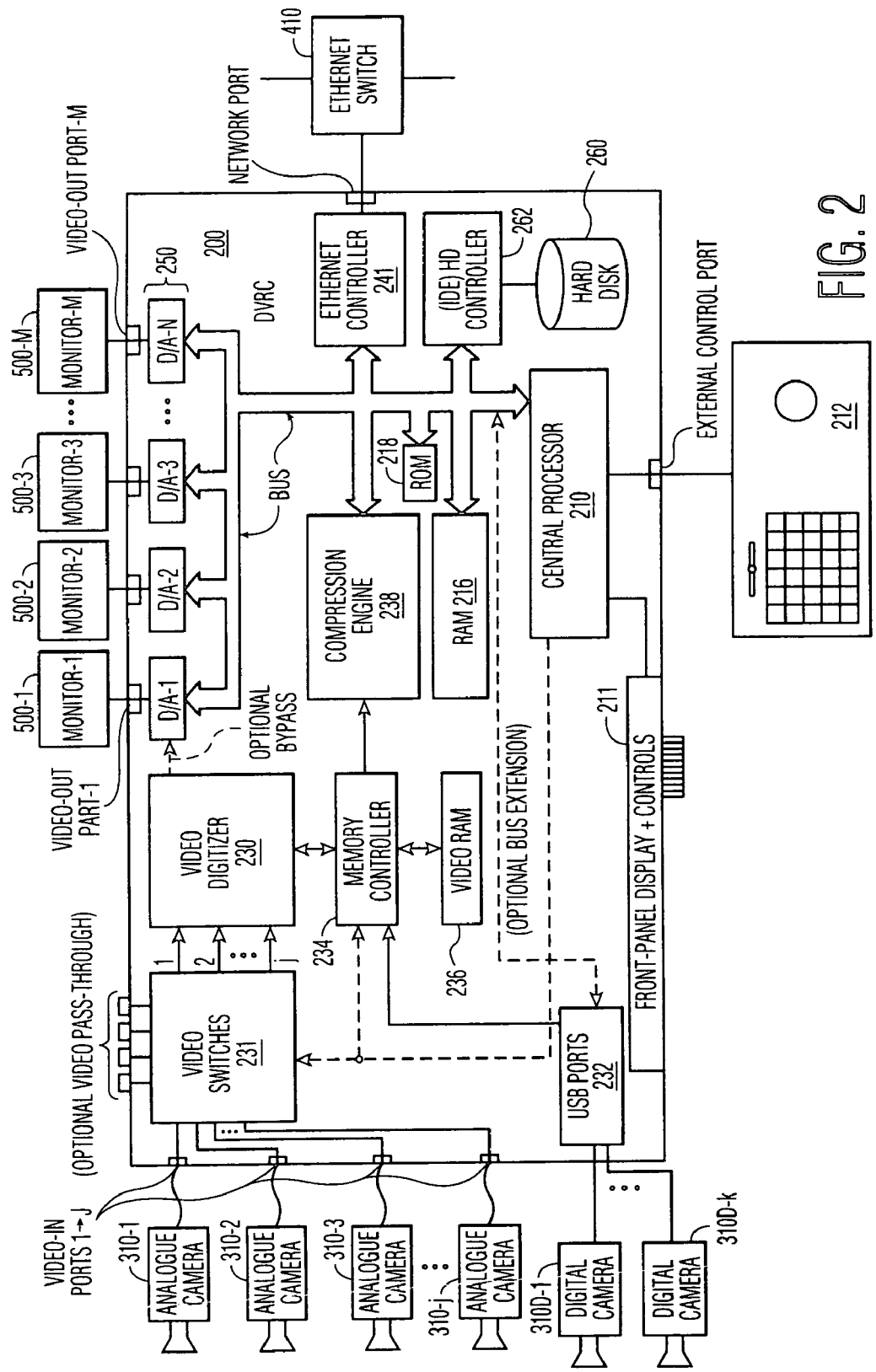
FIG. 2 depicts a simplified block diagram of a single Digital Video Recorder-Controller (DVRC) in accordance with embodiments of the invention.

FIG. 2 depicts a simplified functional block diagram of exemplary internal circuits within a single Digital Video Recorder-Controller (DVRC) in accordance with embodiments of the invention. The above described features, functions and operations of each inventive DVRC may be implemented by various microprocessor-based apparatus, such as the apparatus depicted in FIG. 2, including appropriate software products adapted to provide and/or to direct the performance of the inventive DVRC's features, functions and operations. It is believed that existing microprocessor-based DVRs that include built-in Ethernet ports for transmitting video information for display on the monitor of a remote Personal Computer, such as Philips' model DMX-16, may be transformed into an inventive DVRC, by changing its internal software to enable and to direct it to perform many or all of the disclosed features, functions, and operations of the inventive DVRCs. Accordingly, an inventive DVRC may be readily produced which has at least 16-Analog video-input ports for 16 video cameras (e.g., 310-1, 310-2, ... 310-*j*, where j=16); one; 10base-T or one 100base-T or faster Ethernet controller 241 and associated ports for transmitting receiving and/or transmitting control signals, and for receiving and/or transmitting video signals for display and/or recording; at least two monitor ports (video-out ports) for at least two monitors 500 (e.g., 500-1, 500-2, 500-3, 500-M) for display of local video images (from the connected cameras of same DVRC) or of remote video images (from cameras connected to other DVRs or DVRCs on the ethernet network in the system 100), a 75 GB or larger Hard Disk Drive 260, and dedicated function buttons, controls and displays on front-panel 211, and, an external control keyboard 212 for control of the same, or of remote DVRCs and/or DVRs.

Exemplary embodiments of the inventive DVRC include a central processor (e.g., a digital microprocessor or a digital signal processor DSP) operatively coupled to a digital processor BUS. The central processor 210 operates according to instructions provided in an inventive software product to be stored in a non-volatile memory coupled to the BUS. The non-volatile memory for storing the software product may be a ROM (i.e., Read Only Memory) or RAM (Random Access Memory) or a digital mass-storage device operatively coupled to the BUS (e.g., such as Hard Disk Drive 260 via IDE HDD controller 262, or a DVD-RAM device (not shown), or a tape drive (not shown)).

All video information received by the DVRC from the connected video cameras (310 or 310D) or from remote DVRCs via the Ethernet controller 241 may be directed onto the processor BUS. Therefore, the RAM, and/or digital mass-storage device (e.g., HDD 260) operatively coupled to the BUS may also perform the DVRC's function of recording and storing video signal information from a plurality of local and remote video cameras 310.

A DVRC coupled to Analog video cameras will include internal Analog video switches 231 controlled by the front panel controls 211 or by the control keyboard 212 via the central processor 210. As will be understood by persons skilled in the art, a plurality of Analog video cameras 310 (e.g., 310-1, 310-2, 310-3, 310-*j*) may be operatively coupled to the DVRC's internal processor BUS through a subsystem comprising one or more video switche(s) 231 coupled to one or more video digitizer(s) 230, each video digitizer 230 being operatively coupled to a memory controller 234 and a video-RAM 236. These circuits can support time-base correction (necessary for processing unsynchronized analog cameras). The memory controller 234 transmits the selected video image information received from the connected cameras (310 and 310D) to one or more compression engine(s) 238 which reduces the number of transmitted bytes of the video information by known methods, such as by employing an MPEG video compression algorithm, rejecting information redundant within and/or between frames. The compression engine (s) 238 may also perform de-compression of compressed video (e.g., for local display of video). The compression engine 238 presents the compressed video data on the BUS for storage and/or transmission for remote display and/or recording by other DVRCs via the ethernet controller 241, and/or for local storage by the RAM and/or digital mass-storage device (e.g., HDD 260) on the BUS. Compressed digitized video signals may be decompressed by the compression engine 238 for display of such video signals on a plurality of monitors 500 (e.g., 500-1, 500-2, 500-3, ... 500-M). If the monitors are analog monitors, a plurality of Digital-to-Analog converters 250, may be provided to convert the digitized video signals into analog video signals for display on such analogue monitors.

While this invention has been described in conjunction with the exemplary embodiments outlined above, it is evident that many alternatives, modifications and variations will be apparent to those skilled in the art. For example, where a plurality (e.g., N=3) of 16-channel DVRCs (e.g., DVRCs having 16 Analog video-in ports for connecting with 16 Analog video cameras) are installed at a single location (e.g., one central security and surveillance room), the three DVRCs can be configured to appear and to operate as a single, 48 channel DVR, with one control/monitoring keyboard 212 and access therefrom to all the connected cameras 310 from one location. It is also to be understood that the network need not be limited to an "ethernet" network, but may be of any other known or future digital network technology having sufficient bandwidth and being otherwise capable of transmitting the digital video signals and control signals. In such a case, a network port appropriate to the selected network technology would be added to or substituted in the inventive DVRC to perform all the functions herein above described as the functions of an ethernet port therein. Accordingly, the embodiments of the invention as set forth above are intended to be illustrative, and not limiting. Various changes may be made without departing from the spirit and scope of the invention as defined in the following claims.

We claim:

1. A first digital video recorder-controller apparatus (DVRC), comprising:

a network port for communicatively connecting the first DVRC with at least one other apparatus on a network, wherein the network port is an ethernet port;

wherein the first DVRC is adapted to transmit through the network port a first selection of digitized video signals, wherein the first selection includes one or more digitized video signals being transmitted to a first other apparatus on the network;

and wherein the first DVRC is further adapted to receive through the network port a second selection of digitized video signals, wherein the second selection includes one or more digitized video signals being transmitted by a second other apparatus on the network, wherein the second other apparatus is one of a digital video recorder (DVR) or a second DVRC;

wherein the first DVRC is adapted to facilitate designation of the digitized video signals of the second selection, and wherein the first DVRC is further adapted to transmit a first control signal to the second other apparatus, wherein the first control signal designates the one or more video signals of the second selection of digitized video signals to be transmitted by the second other apparatus.

2. The DVRC of claim 1, further comprising an integrated control panel having dedicated function buttons adapted to facilitate selecting one or more video signals of the first selection and of the second selection.

3. The DVRC of claim 1, further comprising an external control port, adapted to facilitate selecting one or more video signals of the first selection and of the second selection.

4. The DVRC of claim 1, further comprising a plurality of video-out ports adapted to display one or more video signals derived from the first selection or from the second selection; and wherein the first DVRC is adapted to record one or more video signals of the second selection of digitized video signals.

5. The DVRC of claim 1, wherein the first other apparatus is a second DVRC on the network.

6. The DVRC of claim 1, wherein the second other apparatus is a digital video recorder (DVR).

7. The DVRC of claim 1, wherein the second other apparatus is a second DVRC operating in slave-mode on the network.

8. The DVRC of claim 1, further comprising a plurality of Analog video-in ports for receiving one or more video signals to be digitized to become one or more digitized video signals.

9. The DVRC of claim 1, further comprising at least one digital video-in port, for receiving one or more digitized video signals.

10. A digital video system, comprising:
an ethernet network;
a first plurality of video cameras operatively connected to a digital video recorder-controller apparatus (DVRC) on the network, the DVRC having:
a first ethernet network port for communicatively connecting the DVRC with at least one other apparatus on the ethernet network;
a first plurality of video-out ports adapted to facilitate the display of one or more video signals on one or more DVRC monitors;
wherein the DVRC is adapted to receive through the first network port a first selection of digitized video signals including one or more digitized video signals transmitted by a first other apparatus on the ethernet network; and
a second plurality of video cameras operatively connected to a digital video recorder (DVR) on the ethernet network, the DVR having:
a second plurality of video-out ports adapted to facilitate the display of one or more video signals on one or more DVR monitors;
a second network port for communicatively connecting the DVR with the DVRC on the ethernet network;
wherein the DVR is the first other apparatus on the network, and wherein the DVR is adapted to transmit through the second network port a second selection of digitized video signals, wherein the second selection of digitized video signals includes one or more digitized video signals of the first selection of digitized video signals; and wherein the DVRC is further adapted to transmit a control signal to the DVR, the control signal designating the second selection of digitized video signals to be transmitted by the DVR.

11. The digital video recording system of claim 10, wherein at least one video camera of the first plurality of video cameras is an Analog video camera, and at least one video camera of the second plurality of video cameras is an Analog video camera.

12. The digital video system of claim 10, wherein the DVRC is adapted to output through the DVRC's first plurality of video-out ports one or more of the digitized video signals of the second selection of digitized video signals.

13. The digital video system of claim 10, wherein the DVRC is adapted to record and store one or more of the digitized video signals of the second selection of digitized video signals.

14. A method for expanding a digital video system, comprising:
a) providing a first digital video recorder-controller apparatus (DVRC) having:
a DVRC network port, wherein the DVRC network port is an ethernet port;
at least one control panel;
wherein the first DVRC is adapted to receive through the DVRC network port a first selection of digitized video signals; and
a plurality of DVRC video-out ports adapted to facilitate the display of one or more video signals on one or more video monitors;
b) providing an ethernet network and connecting the first DVRC to the network; and
c) connecting a digital video recorder (DVR) to the ethernet network, the DVR having;
a plurality of DVR video-in ports, for receiving video signals from video cameras;
a DVR network port, wherein the DVR network port is an ethernet port;
wherein the DVR is adapted to transmit through the DVR network port a DVR selection of digitized video signals, wherein the DVR selection of digitized video signals includes one or more digitized video signals of the first selection of digitized video signals, and wherein the DVRC is adapted to transmit a control signal to the DVR, the control signal designating the DVR selection of digitized video signals to be transmitted by the DVR.

15. The method claim 14, wherein providing a DVRC includes modifying internal software of a DVR.

16. The method of claim 14, wherein c) is repeated by connecting additional DVRs to the network, whereby the digital video system is expanded to include at least one DVRC and a plurality of DVRs, each DVR having:
a plurality of DVR video-in ports, for receiving video signals from video cameras;
a DVR network port;
wherein each DVR is adapted to transmit through its DVR network port a DVR selection of digitized video signals, wherein each DVR selection of digitized video signals can include one or more digitized video signals of the first selection of digitized video signals; and
wherein the first DVRC transmits through the network a control signal to one or more of the plurality of DVRs.

* * * * *